United States Patent [19]

Yamaoka et al.

[11] Patent Number: 4,535,383
[45] Date of Patent: Aug. 13, 1985

[54] GAS-INSULATED SWITCHGEAR EQUIPMENT

[75] Inventors: Yukinori Yamaoka, Hitachi; Takeshi Takahashi, Kitaibaraki, both of Japan

[73] Assignee: Hitachi, Ltd., Tokyo, Japan

[21] Appl. No.: 606,221

[22] Filed: May 2, 1984

[30] Foreign Application Priority Data

May 2, 1983 [JP] Japan ................................. 58-76143

[51] Int. Cl.³ ...................... H02B 1/20; H01H 33/54
[52] U.S. Cl. .................................... 361/341; 361/331; 361/376; 200/148 B
[58] Field of Search ....................... 200/148 B, 148 R; 361/331, 341, 376, 333, 350, 131, 115, 14

[56] References Cited

U.S. PATENT DOCUMENTS 4,354,220 10/1982 Oishi et al. .......................... 361/341
4,468,716 8/1984 Kamata et al. ...................... 361/131

Primary Examiner—Robert S. Macon
Attorney, Agent, or Firm—Antonelli, Terry & Wands

[57] ABSTRACT

A gas-insulated switchgear equipment includes a main bus conduit containing a main bus conductor and disposed substantially horizontally, and a container connected substantially vertically to the main bus conduit at a top portion thereof for accommodating a disconnecting switch unit which is composed of a pair of contact members one of which is to be electrically connected to the bus conductor. Spacers are disposed substantially vertically at predetermined positions in the main bus conduit for defining a gas-filled compartment for the disconnecting switch unit. A post-like insulation support is fixedly mounted on the container of the disconnecting switch unit for securely supporting a stationary conductor mounted on the contact member to be electrically connected to the bus bar. A tulip-like current collector for connecting one end of a branch conductor having the other end connected to the bus conductor and the stationary conductor to each other.

2 Claims, 5 Drawing Figures

GAS-INSULATED SWITCHGEAR EQUIPMENT

The present invention relates generally to a gas-insulated switchgear equipment and more particularly to a disconnecting switch disposed between a main bus and a gas-filled circuit breaker.

Figure 1:
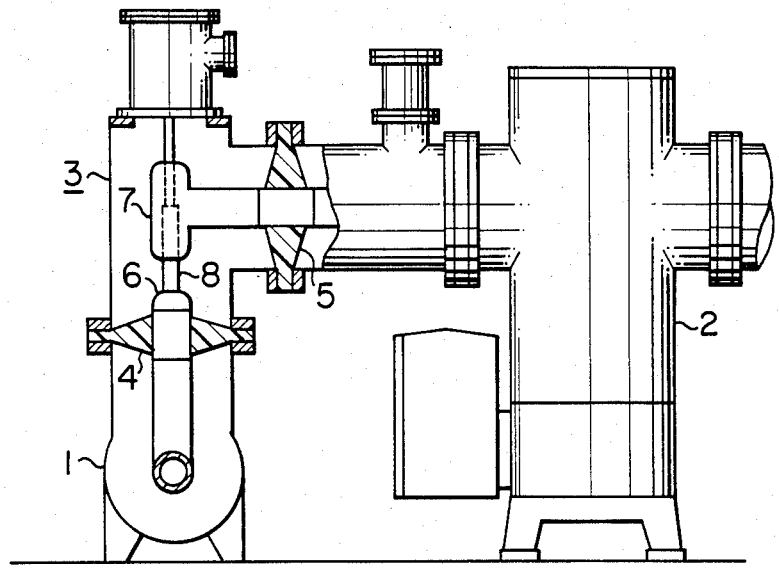
FIG. 1 is a partially sectioned side elevational view of a hitherto known gas-insulated switchgear equipment.

Referring to FIG. 1 of the accompanying drawings which shows a hitherto known gas-insulated switchgear equipment, a disconnecting switch is connected between a main bus 1 and a circuit breaker 2. Disposed at both sides of the disconnecting switch 3 are insulation spacers 4 and 5, respectively, which cooperate to define a gas-filled compartment for the disconnecting switch.

The insulation spacer 4 is disposed horizontally above the main bus 1 and serves to support a stationary contact 6 of the disconnecting switch 3. On the other hand, the insulation spacer 5 is disposed between the disconnecting switch 3 and the circuit breaker 2 and serves for supporting a current collector element 7 of the disconnecting switch 3. A movable contact element 8 which is electrically connected to the collector element 7 slidably relative to the latter is disconnectably brought into contact with the stationary contact 6.

In the disconnecting switch of the structure described above, dusts adhering to the constituent parts of the switch, metallic particles produced in the course of assembling the switchgear and electrically conductive products produced upon breaking of a loop current are likely to be cumulatively deposited on the insulation spacer 4, to give rise to a danger of the insulation property being degraded.

An object of the present invention is to provide an gas-insulated switchgear equipment in which degradation in the insulation property or capability due to the deposition of dusts and other electrically conductive particles on the insulation spacer is positively prevented and which is excellent in assuring the inter-pole insulation of the disconnecting switch.

In view of the above object, it is proposed according to the present invention that the horizontally disposed insulation space of the conventional disconnecting switch is omitted by supporting the stationary contact by means of an insulation supporting member of a post-like configuration while assuring an improved insulation in the inter-pole space between the contact of the disconnecting switch.

The above and other objects, features and advantage of the invention will become readily apparent upon consideration of the following detailed description of the preferred embodiments taken in conjunction with the drawings.

Now, the invention will be described in conjunction with the preferred embodiments thereof.

Figure 2:
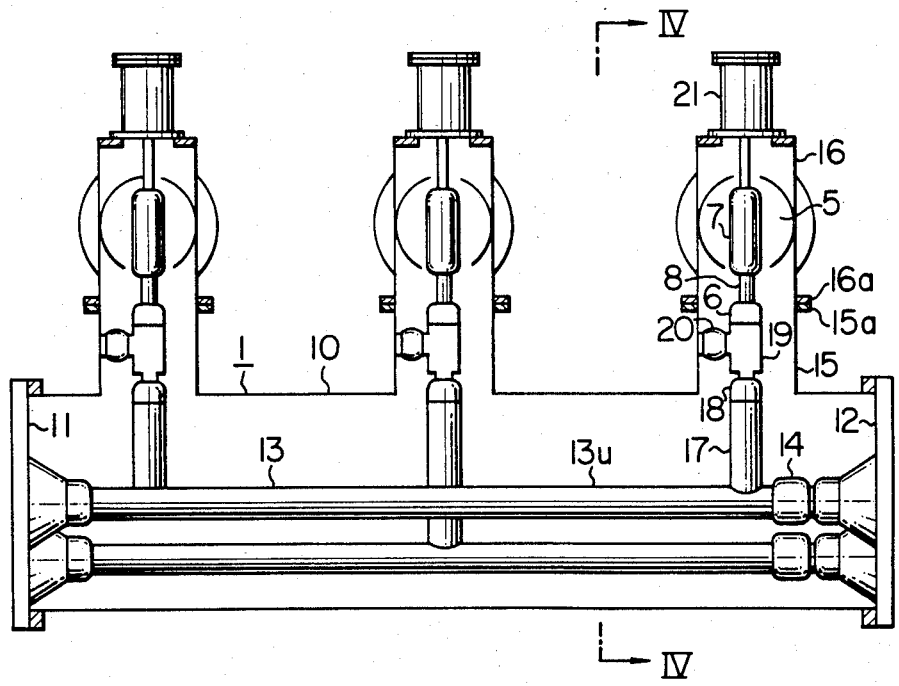
FIG. 2 is a schematic sectional view showing a main portion of a gas-insulated switchgear equipment according to an embodiment of the present invention.

FIG. 2 shows disconnecting switches separately constructed for each of three phases and connected, being branched from a three-phase bus en bloc.

Referring to FIG. 2, a main bus 1 has a predetermined axial length and includes a main bus conduit or tube 10 having vertical insulation spacers 11 and 12 mounted at both ends, respectively. Three-phase bus bar conductors 13 are supported between the insulation spacers 11 and 12. Further, post-like insulation supports 25 may be additionally employed for supporting the bus bars in the main bus conduit 10 in the manner shown in FIG. 4. Tulip-like current collectors 14 are disposed on the bus bar conductors 13 at appropriate positions, respectively, for accommodating axial stretch and contraction of the bus bar conductors. Containers for the disconnecting switches for three phases are realized in the diametrically upward direction of the main bus tube 10. Each of the containers for the disconnecting switches includes a lower container part 15 branched from the main bus tube 10 and an upper container part 16 which is connected to the lower container part 15 by means of flanges 15a and 16a. The container accommodates therein a contact mechanism of the disconnecting switch described hereinafter. As a version of the illustrated embodiment, the upper container part 16 may be integrally formed with the lower container part 15 instead of being connected or joined by the flanges 16a and 15a.

In this way, the gas-filled compartment for the disconnector switch is realized by making use of a part of the main bus. More specifically, the gas-filled compartment of the disconnector switch is defined between the insulation spacers 11 and 12 and an insulation spacer 5 shown in FIG. 4.

Since the structure of the disconnecting switches as well as the associated parts thereof is identical for all of three-phases, description will be made on the structure for one phase.

Figure 3:
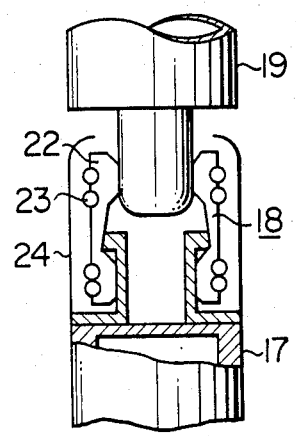
FIG. 3 is an enlarged view of a tulip-like current collector shown in FIG. 2.

As described above, the lower container part 15 is provided with the flange 15a which is coupled to the flange 16a of the upper container part 16. A tulip-like current collector 18 of the structure shown in FIG. 3 is mounted on the top of a branch conductor bar 17 branched from the bus bar conductor 13u for u-phase. A fixed conductor 19 is electrically connected at the lower end to the tulip-like current collector 18. As a modification, the tulip-like current collector 18 may be fixedly mounted on the lower end of the fixed conductor 19. Additionally, the fixed conductor 19 is secured to the inner wall of the lower container part or branch tube 15 by means of a post-like insulation support 20. A stationary contact member 6 of the disconnecting switch is mounted on the top of the fixed or stationary conductor 19. A movable contact member 8 which cooperates with the stationary contact 6 is constantly in contact with a current collector 7 and driven downwardly or upwardly in the vertical direction by means of an actuator 21. The current collector 7 is supported by the insulation spacer 5 as in the case of the conventional disconnecting switch shown in FIG. 1. The joint between the flanges 15a and 16a should preferably be positioned between the opposite ends of the stationary contact member 6 and the current collector 7 and more desirably in the vicinity of the post-like insulation support 20.

As described before, since the insulation spacers 11 and 12 are disposed vertically with the stationary contact 6 being supported by the post-like insulation support 20, decomposed products produced upon breaking of a loop current and foreign particles adhering to the current collector 7 are positively prevented from being deposited or cumulating on the insulation spacers 11 and 12.

Figure 4:
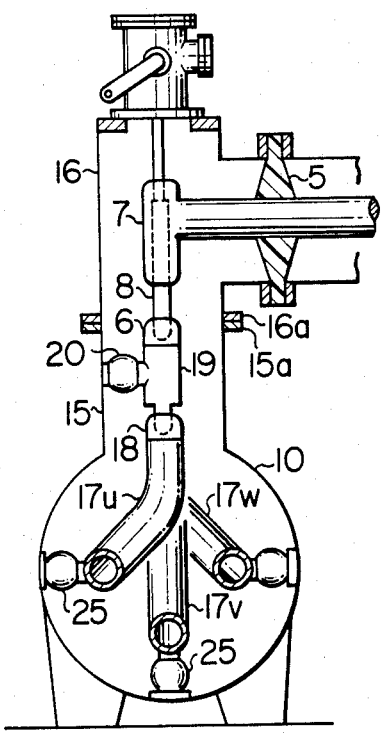
FIG. 4 is a sectional view taken along the line IV–IV in FIG. 2.

FIG. 4 is a sectional view taken along the line III—III in FIG. 2, wherein the post-like insulation support 20 is shown at a position displaced in the circumferential direction of the branch tube 15 for convenience of illustration.

As will be seen from FIG. 4, among the branch conductors, the u-phase branch conductor 17u and the w-phase branch conductor 17w are branched along respective arcuate paths. As the consequence, the axial length of these branch conductors 17u and 17w is relatively long. Here, consideration is given to thermal stretch or elongation of the bus conductor 13u shown in FIG. 2 and that of the branch conductor 17u. Apparently, the lower end of the branch conductor 17u is subjected to a force in the axial direction of the bus conductor 13u due to the stretch of the latter in the same direction. On the other hand, the thermal stretch of the branch conductor 17u tends to displace upwardly the upper end thereof.

However, it should be noted that in the case of the illustrated embodiment, all the stretches mentioned above can be absorbed by the tulip-like current collector 18. Further, by virtue of this structure, the position of the stationary contact 6 of the disconnecting switch is prevented from being changed under the influence of temperature, which means that the distance between the stationary contact 6 and the current collector 7, i.e. the inter-pole distance can be maintained constant, to thereby assure an improved inter-pole insulation. Assuming that the tulip-like current collector 18 was absent, the stretch of the integral branch conductor 17 and fixed conductor 19 would vary the position of the stationary contact 6 of the disconnecting switch. Further, the conductor 19 would have to be fixed by means of a supporting structure which permits the sliding or displacement of the post-like insulation support 20, involving much complicated supporting structure. On the other hand, if the post-like insulation support 20 was provided within the main bus tube 10, a great difficulty would be encountered in installing the tulip-like current collector 18 between the post-like insulation support 20 and the bus conductor bar 13u. Further, taking into consideration the fact that the post-like insulation support of a same configuration such as shown in FIG. 3 is employed for a given rated power, potential distribution in the space between the joint of the main bus tube 10 and the lower container part 15 and the branch conductor 17u would be disturbed if the post-like insulation support was provided within the main bus tube 10, as the result of which the dielectric strength of the joint between the main bus tube 10 and the lower container part 15 would be decreased. For these reasons, it is preferred that the post-like insulation support 20 is secured to the container of the disconnecting switch.

As will be appreciated from the foregoing elucidation, the relationship between the post-like insulation support 20 and the tulip-like current collector 18 is so established that the post-like insulation support 20 serves to support the one contact 6 of the disconnecting switch and that the connection by using the tulip-like current collector 18 has to be realized on the way to the connection between the post-like insulation support 20 and the bus bar conductor 13u.

FIG. 3 shows an exemplary embodiment of the tulip-like current collector 18. As is shown in the figure, the collector 18 is composed of a plurality of contact fingers 22 disposed around the outer peripheries of the opposite end portions of the conductors 17 and 19 and springs 23 for imparting contacting pressure and an electric-field buffering shield 24 which covers the whole structure of the collector 18.

Figure 5:
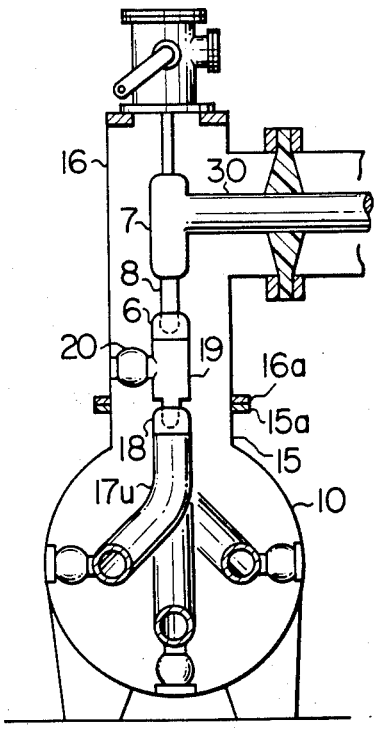
FIG. 5 is a sectional view similar to FIG. 4 showing a main portion of the gas-insulated switchgear equipment according to another embodiment of the present invention.

FIG. 5 shows another exemplary embodiment of the present invention, in which parts equivalent to those shown in FIG. 4 are denoted by like reference numerals. The following description will be concentrated on those parts or portions which differ from the structure shown in FIG. 4.

It should first be noted that the axial length of the lower container part 15 is selected shorter, while that of the upper container part 16 is correspondingly increased, wherein the joint between the flanges 15a and 16a of both container parts 15 and 16 is located at a position in the vicinity of the connection between the tulip-like current collector 20 and the stationary conductor 19. The post-like insulation support 20 is secured to the lower container part 16 in the vicinity of the flange 16a. The lower and upper container parts 15 and 16 cooperate to constitute the container for the disconnecting switch in the same manner as in the preceding embodiment.

With the structure shown in FIG. 5, it is possible to mount the stationary contact 6 of the disconnecting switch after the relation between the current collector 7 and the movable contact 8 has been adjusted within the upper container part 16. Tolerance or error which should be compensated for upon coupling of the lower and upper container parts 15 and 16 to each other can be absorbed by the tulip-like current collector 18. Accordingly, the inter-pole distance and hence insulation of the disconnecting switch undergo no adverse influence when the lower and upper container parts 15 and 16 are joined together.

The structure shown in FIG. 5 provides an excellent advantage in that careful adjustment procedure can be lessened upon assembling of the switchgear equipment, even when the disconnecting switch unit and the main bus structure 1 have to be transported in the state separated from each other.

The foregoing description has been made in conjunction with the gas-insulated switchgear equipment having a three-phase bus en bloc. However, it should be appreciated that the invention can equally be applied to the gas-insulated switchgear equipment provided with the main buses separately for three phases in which the branch conductors 17 are of correspondingly increased lengths. Further, the structure of the disconnecting switch can be applied to a gas-insulated switchgear equipment in which the disconnecting switches for three phases are constructed en block or to a gas-insulated switchgear equipment in which the disconnecting switch is constituted by the stationary contact, the movable contact and the current collector which are disposed along the axial line of the conductor 30 shown in FIG. 5. Particularly in the case of the latter structure, since the contact of the disconnecting switch which is supported by the post-like insulation support 20 is constituted by the movable contact and the current collector, it is safe to say that according to the teaching of the invention at least one of the contacts of the disconnecting switch is supported by the post-like insulation support 20.

As will be appreciated from the foregoing, in the switchgear equipment according to the invention in which the stationary contact 6 of the disconnecting switch is fixedly supported by the post-like insulation support 20 and in which the connecting part constituted by the tulip-like current collector 18 is disposed between the post-like insulation support 20 and the bus bar 13, degradation in the insulating property or capability of the switchgear equipment due to deposition or cumulation of foreign substances can be positively prevented, while the inter-pole space as well as insulation of the disconnecting switch can be securely protected from adverse influence due to thermal stretch and contraction of the conductors.

Furthermore, since the tulip-like insulation support 20 is fixedly mounted on the container part 16 for the disconnecting switch which is joined to the lower container part 15, the inter-pole space or distance of the disconnecting switch will undergo no variations in the course of assembling the switch container. Besides, adjustment as required can be carried out separately for the disconnecting switch unit mounted within the container. This feature is very advantageous in the case where the disconnecting switch unit and the main bus unit have to be separately transported to the place where the switchgear equipment is to be installed.

We claim:

1. In a gas-insulated switchgear equipment which includes a main bus conduit containing a main bus conductor and disposed substantially horizontally, and a container connected to said main bus conduit at a top portion thereof for accommodating a disconnecting switch unit, wherein said disconnecting switch unit is composed of a pair of contact members one of which is to be electrically connected to said bus conductor, said gas-insulated switchgear equipment comprising: spacers disposed substantially vertically at predetermined positions in said main bus conduit for defining a gas-filled compartment for said disconnecting switch unit, post-like insulation support means fixedly mounted on said container of said disconnecting switch unit for securely supporting a stationary conductor mounted on the contact member to be electrically connected said bus bar, and a tulip-like current collector for connecting one end of a branch conductor having the other end connected to said bus conductor and said stationary conductor to each other.

2. In a gas-insulated switchgear equipment which includes a main bus conduit containing a main bus conductor and disposed substantially horizontally, and a container connected to said main bus conduit at a top portion thereof for accommodating a disconnecting switch unit, wherein said disconnecting switch unit is composed of a pair of contact members one of which is electrically connected to said bus conductor, said gas-insulated switchgear equipment comprising: spacers disposed substantially vertically at predetermined positions in said main bus conduit for defining a gas-filled compartment for said disconnecting switch unit, an upper container part and a lower container part joined together to constitute said container for said disconnecting switch unit, post-like insulation support means fixedly mounted on said upper container part for securely supporting a stationary conductor on which said one contact member to be connected to said bus conductor is mounted, and a tulip-like current collector for connecting one end of a branch conductor having the other end connected to said bus conductor and said stationary conductor to each other, wherein said tulip-like current collector is disposed in the vicinity of the joint between said upper container part and said lower container part.

* * * * *